United States Patent
Barkatullah

(10) Patent No.: US 9,967,546 B2
(45) Date of Patent: May 8, 2018

(54) METHOD AND APPARATUS FOR CONVERTING 2D-IMAGES AND VIDEOS TO 3D FOR CONSUMER, COMMERCIAL AND PROFESSIONAL APPLICATIONS

(71) Applicant: VEFXi Corporation, Hillsboro, OR (US)

(72) Inventor: Javed Sabir Barkatullah, Portland, OR (US)

(73) Assignee: VEFXI Corporation, Hillsboro, OR (US)

( * ) Notice: Subject to any disclaimer, the term of this patent is extended or adjusted under 35 U.S.C. 154(b) by 262 days.

(21) Appl. No.: 14/522,211

(22) Filed: Oct. 23, 2014

(65) Prior Publication Data

US 2015/0116457 A1    Apr. 30, 2015

Related U.S. Application Data

(60) Provisional application No. 61/897,106, filed on Oct. 29, 2013.

(51) Int. Cl.
*H04N 13/00* (2018.01)
*H04N 13/02* (2006.01)

(52) U.S. Cl.
CPC .................................. *H04N 13/026* (2013.01)

(58) Field of Classification Search
None
See application file for complete search history.

(56) References Cited

U.S. PATENT DOCUMENTS

| | | | |
|---|---|---|---|
| 4,180,313 A | 12/1979 | Innuiya | |
| 5,465,175 A | 11/1995 | Woodgate et al. | |
| 5,650,876 A | 7/1997 | Davies et al. | |
| 5,654,810 A | 8/1997 | Okamura et al. | |
| 5,663,831 A | 9/1997 | Mashitani et al. | |
| 5,731,853 A | 3/1998 | Taketomi et al. | |
| 5,731,899 A | 3/1998 | Meyers | |
| 5,751,383 A | 5/1998 | Yamanaka | |
| 5,757,545 A | 5/1998 | Wu et al. | |
| 5,771,121 A | 6/1998 | Hentschke | |
| 5,781,229 A | 7/1998 | Zediker et al. | |
| 5,808,797 A | 9/1998 | Bloom | |

(Continued)

FOREIGN PATENT DOCUMENTS

| WO | 2012068532 A2 | 5/2012 |
|---|---|---|
| WO | 2013109252 A1 | 7/2013 |
| WO | 2015026017 A1 | 2/2015 |

OTHER PUBLICATIONS

International Search Report and Written Opinion, PCT International Patent Application No. PCT/US2016/061313, Craig Peterson, dated Jan. 19, 2017, 22 pages.

*Primary Examiner* — Edemio Navas, Jr.
(74) *Attorney, Agent, or Firm* — Chernoff Vilhauer, LLC

(57) ABSTRACT

A method for converting a 2D images and videos to 3D includes applying a set of pre-defined heuristic rules to assign a depth value for each pixel of a two-dimensional (2D) image source based on pixel attributes to generate an initial default depth map, refining the pre-defined heuristic rules to produce customized heuristic rules, applying the customized heuristic rules to the initial default depth map to produce a refined depth map, and rendering a three-dimensional (3D) image in a predefined format using the refined depth map.

16 Claims, 10 Drawing Sheets

(56) References Cited

U.S. PATENT DOCUMENTS

| | | | |
|---|---|---|---|
| 5,822,125 A | 10/1998 | Meyers | |
| 5,825,552 A | 10/1998 | Kurtz et al. | |
| 5,831,765 A | 11/1998 | Nakayama et al. | |
| 5,841,579 A | 11/1998 | Bloom et al. | |
| 5,852,512 A | 12/1998 | Chikazawa | |
| 5,855,425 A | 1/1999 | Hamagishi | |
| 5,864,375 A | 1/1999 | Taketomi et al. | |
| 5,894,364 A | 4/1999 | Nagatani | |
| 5,896,225 A | 4/1999 | Chikazawa | |
| 5,914,805 A | 6/1999 | Crowley | |
| 5,943,166 A | 8/1999 | Hoshi et al. | |
| 5,969,850 A | 10/1999 | Harrold et al. | |
| 5,969,872 A | 10/1999 | Ben Oren et al. | |
| 5,982,553 A | 11/1999 | Bloom et al. | |
| 5,986,804 A | 11/1999 | Mashitani et al. | |
| 5,991,074 A | 11/1999 | Nose et al. | |
| 5,993,003 A | 11/1999 | McLaughlin | |
| 5,993,004 A | 11/1999 | Moseley et al. | |
| 6,014,164 A | 1/2000 | Woodgate et al. | |
| 6,014,187 A | 1/2000 | Taketomi et al. | |
| 6,020,931 A | 2/2000 | Bilbrey et al. | |
| 6,040,807 A | 3/2000 | Hamagishi et al. | |
| 6,048,081 A | 4/2000 | Richardson | |
| 6,049,352 A | 4/2000 | Allio | |
| 6,061,083 A | 5/2000 | Aritake et al. | |
| 6,064,424 A | 5/2000 | van Berkel et al. | |
| 6,088,102 A | 7/2000 | Manhart | |
| 6,097,554 A | 8/2000 | Watkins | |
| 6,101,036 A | 8/2000 | Bloom | |
| 6,130,770 A | 10/2000 | Bloom | |
| 6,151,062 A | 11/2000 | Inoguchi et al. | |
| 6,157,402 A | 12/2000 | Torgeson | |
| 6,188,518 B1 | 2/2001 | Martin | |
| 6,215,579 B1 | 4/2001 | Bloom et al. | |
| 6,215,590 B1 | 4/2001 | Okano | |
| 6,219,184 B1 | 4/2001 | Nagatani | |
| 6,224,214 B1 | 5/2001 | Martin et al. | |
| 6,254,246 B1 | 7/2001 | Tiao et al. | |
| 6,259,450 B1 | 7/2001 | Chiabrera et al. | |
| 6,266,106 B1 | 7/2001 | Murata et al. | |
| 6,266,176 B1 | 7/2001 | Anderson et al. | |
| 6,271,808 B1 | 8/2001 | Corbin | |
| 6,304,263 B1 | 10/2001 | Chiabrera et al. | |
| 6,337,721 B1 | 1/2002 | Hamagishi et al. | |
| 6,381,072 B1 | 4/2002 | Burger | |
| 6,385,882 B1 | 5/2002 | Conley et al. | |
| 6,388,815 B1 | 5/2002 | Collins, Jr. et al. | |
| 6,445,406 B1 | 9/2002 | Taniguchi et al. | |
| 6,462,871 B1 | 10/2002 | Morishima | |
| 6,481,849 B2 | 11/2002 | Martin et al. | |
| 6,525,889 B1 | 2/2003 | Collins, Jr. et al. | |
| 6,533,420 B1 | 3/2003 | Eichenlaub | |
| 6,547,628 B1 | 4/2003 | Long | |
| 6,574,047 B2 | 6/2003 | Hawver | |
| 6,674,939 B1 | 1/2004 | Anderson et al. | |
| 6,697,042 B1 | 2/2004 | Cohen et al. | |
| 6,700,701 B1 | 3/2004 | Son et al. | |
| 6,707,591 B2 | 3/2004 | Amm | |
| 6,712,480 B1 | 3/2004 | Leung et al. | |
| 6,714,173 B2 | 3/2004 | Shinoura | |
| 6,724,951 B1 | 4/2004 | Anderson et al. | |
| 6,727,866 B2 | 4/2004 | Wang et al. | |
| 6,728,023 B1 | 4/2004 | Alioshin et al. | |
| 6,736,512 B2 | 5/2004 | Balogh | |
| 6,747,781 B2 | 6/2004 | Trisnadi | |
| 6,760,140 B1 | 7/2004 | Argueta-Diaz et al. | |
| 6,764,875 B2 | 7/2004 | Shook | |
| 6,766,073 B1 | 7/2004 | Anderson | |
| 6,767,751 B2 | 7/2004 | Hunter | |
| 6,775,048 B1 | 8/2004 | Starkweather et al. | |
| 6,782,205 B2 | 8/2004 | Trisnadi et al. | |
| 6,791,570 B1 | 9/2004 | Schwerdtner et al. | |
| 6,795,250 B2 | 9/2004 | Johnson et al. | |
| 6,800,238 B1 | 10/2004 | Miller | |
| 6,801,354 B1 | 10/2004 | Payne et al. | |
| 6,806,997 B1 | 10/2004 | Dueweke et al. | |
| 6,813,059 B2 | 11/2004 | Hunter et al. | |
| 6,822,797 B1 | 11/2004 | Carlisle et al. | |
| 6,829,077 B1 | 12/2004 | Maheshwari | |
| 6,829,092 B2 | 12/2004 | Amm et al. | |
| 6,829,258 B1 | 12/2004 | Carlisle et al. | |
| 6,877,882 B1 | 4/2005 | Haven et al. | |
| 7,047,019 B1 * | 5/2006 | Cox | H04W 4/16 455/456.1 |
| 7,139,042 B2 | 11/2006 | Nam et al. | |
| 7,154,653 B2 | 12/2006 | Kean et al. | |
| 7,161,614 B1 | 1/2007 | Yamashita et al. | |
| 7,168,249 B2 | 1/2007 | Starkweather et al. | |
| 7,215,474 B2 | 5/2007 | Argueta-Diaz | |
| 7,236,238 B1 | 6/2007 | Durresi et al. | |
| 7,271,945 B2 | 9/2007 | Hagood et al. | |
| 7,286,280 B2 | 10/2007 | Whitehead et al. | |
| 7,295,264 B2 | 11/2007 | Kim | |
| 7,298,552 B2 | 11/2007 | Redert | |
| 7,304,785 B2 | 12/2007 | Hagood et al. | |
| 7,304,786 B2 | 12/2007 | Hagood et al. | |
| 7,311,607 B2 | 12/2007 | Tedsen et al. | |
| 7,365,897 B2 | 4/2008 | Hagood et al. | |
| 7,405,852 B2 | 7/2008 | Brosnihan et al. | |
| 7,417,782 B2 | 8/2008 | Hagood et al. | |
| 7,425,069 B2 | 9/2008 | Schwerdtner et al. | |
| 7,430,347 B2 | 9/2008 | Anderson et al. | |
| 7,432,878 B1 | 10/2008 | Nayar et al. | |
| 7,450,304 B2 | 11/2008 | Sakai et al. | |
| 7,502,159 B2 | 3/2009 | Hagood, IV et al. | |
| 7,518,663 B2 | 4/2009 | Cornelissen | |
| 7,551,344 B2 | 6/2009 | Hagood et al. | |
| 7,551,353 B2 | 6/2009 | Kim et al. | |
| 7,614,748 B2 | 11/2009 | Nayar et al. | |
| 7,616,368 B2 | 11/2009 | Hagood, IV | |
| 7,619,806 B2 | 11/2009 | Hagood, IV et al. | |
| 7,630,598 B2 | 12/2009 | Anderson et al. | |
| 7,633,670 B2 | 12/2009 | Anderson et al. | |
| 7,636,189 B2 | 12/2009 | Hagood, IV et al. | |
| 7,651,282 B2 | 1/2010 | Zomet et al. | |
| 7,660,499 B2 | 2/2010 | Anderson et al. | |
| 7,675,665 B2 | 3/2010 | Hagood et al. | |
| 7,703,924 B2 | 4/2010 | Nayar | |
| 7,742,016 B2 | 6/2010 | Hagood et al. | |
| 7,746,529 B2 | 6/2010 | Hagood et al. | |
| 7,750,982 B2 | 7/2010 | Nelson et al. | |
| 7,755,582 B2 | 7/2010 | Hagood et al. | |
| 7,817,045 B2 | 10/2010 | Onderko | |
| 7,839,356 B2 | 11/2010 | Hagood et al. | |
| 7,852,546 B2 | 12/2010 | Fijol et al. | |
| 7,857,700 B2 | 12/2010 | Wilder et al. | |
| 7,864,419 B2 | 1/2011 | Cossairt et al. | |
| 7,876,489 B2 | 1/2011 | Gandhi et al. | |
| 7,889,425 B1 | 2/2011 | Connor | |
| 7,891,815 B2 | 2/2011 | Nayar et al. | |
| 7,911,671 B2 | 3/2011 | Rabb | |
| 7,927,654 B2 | 4/2011 | Hagood et al. | |
| 7,978,407 B2 | 7/2011 | Connor | |
| 8,134,779 B2 | 3/2012 | Roh et al. | |
| 8,149,348 B2 | 4/2012 | Yun et al. | |
| 8,159,428 B2 | 4/2012 | Hagood et al. | |
| 8,174,632 B2 | 5/2012 | Kim et al. | |
| 8,179,424 B2 | 5/2012 | Moller | |
| 8,189,039 B2 | 5/2012 | Hiddink et al. | |
| 8,242,974 B2 | 8/2012 | Yamazaki et al. | |
| 8,248,560 B2 | 8/2012 | Kim et al. | |
| 8,262,274 B2 | 9/2012 | Kim et al. | |
| 8,310,442 B2 | 11/2012 | Hagood et al. | |
| 8,363,100 B2 | 1/2013 | Lu | |
| 8,402,502 B2 | 3/2013 | Meuninck et al. | |
| 8,441,602 B2 | 5/2013 | Kim et al. | |
| 8,446,559 B2 | 5/2013 | Kim et al. | |
| 8,482,496 B2 | 7/2013 | Lewis | |
| 8,519,923 B2 | 8/2013 | Hagood, IV et al. | |
| 8,519,945 B2 | 8/2013 | Hagood et al. | |
| 8,520,285 B2 | 8/2013 | Fike, III et al. | |
| 8,526,096 B2 | 9/2013 | Steyn et al. | |
| 8,545,048 B2 | 10/2013 | Kang et al. | |
| 8,545,084 B2 | 10/2013 | Kim et al. | |

(56) References Cited

U.S. PATENT DOCUMENTS

| | | |
|---|---|---|
| 8,558,961 B2 | 10/2013 | Yun et al. |
| 8,587,498 B2 | 11/2013 | Connor |
| 8,587,635 B2 | 11/2013 | Hines et al. |
| 8,593,574 B2 | 11/2013 | Ansari et al. |
| 8,599,463 B2 | 12/2013 | Wu et al. |
| 8,640,182 B2 | 1/2014 | Bedingfield, Sr. |
| 8,651,684 B2 | 2/2014 | Mehrle |
| 8,651,726 B2 | 2/2014 | Robinson |
| 8,659,830 B2 | 2/2014 | Brott et al. |
| 8,675,125 B2 | 3/2014 | Cossairt et al. |
| 8,711,062 B2 | 4/2014 | Yamazaki et al. |
| 8,736,675 B1 | 5/2014 | Holzbach et al. |
| 8,786,685 B1 | 7/2014 | Sethna et al. |
| 8,817,082 B2 | 8/2014 | Van Der Horst et al. |
| 8,860,790 B2 | 10/2014 | Ericson et al. |
| 8,891,152 B2 | 11/2014 | Fike, III et al. |
| 8,897,542 B2 * | 11/2014 | Wei ............... G06K 9/00691 382/154 |
| 8,917,441 B2 | 12/2014 | Woodgate et al. |
| 8,918,831 B2 | 12/2014 | Meuninck et al. |
| 8,937,767 B2 | 1/2015 | Chang et al. |
| 8,947,385 B2 | 2/2015 | Ma et al. |
| 8,947,497 B2 | 2/2015 | Hines et al. |
| 8,947,511 B2 | 2/2015 | Friedman |
| 8,964,009 B2 | 2/2015 | Yoshida |
| 8,988,343 B2 | 3/2015 | Fei et al. |
| 8,994,716 B2 | 3/2015 | Malik |
| 9,001,423 B2 | 4/2015 | Woodgate et al. |
| 9,024,927 B2 | 5/2015 | Koyama |
| 9,030,522 B2 | 5/2015 | Hines et al. |
| 9,030,536 B2 | 5/2015 | King et al. |
| 9,032,470 B2 | 5/2015 | Meuninck et al. |
| 9,049,426 B2 | 6/2015 | Costa et al. |
| 9,082,353 B2 | 7/2015 | Lewis et al. |
| 9,086,778 B2 | 7/2015 | Friedman |
| 9,087,486 B2 | 7/2015 | Gandhi et al. |
| 9,116,344 B2 | 8/2015 | Wu et al. |
| 9,128,277 B2 | 9/2015 | Steyn et al. |
| 9,134,552 B2 | 9/2015 | Ni Chleirigh et al. |
| 9,135,868 B2 | 9/2015 | Hagood, IV et al. |
| 9,158,106 B2 | 10/2015 | Hagood et al. |
| 9,160,968 B2 | 10/2015 | Hines et al. |
| 9,167,205 B2 | 10/2015 | Hines et al. |
| 9,176,318 B2 | 11/2015 | Hagood et al. |
| 9,177,523 B2 | 11/2015 | Hagood et al. |
| 9,182,587 B2 | 11/2015 | Brosnihan et al. |
| 9,182,604 B2 | 11/2015 | Cossairt et al. |
| 9,188,731 B2 | 11/2015 | Woodgate et al. |
| 9,229,222 B2 | 1/2016 | Hagood et al. |
| 9,232,274 B2 | 1/2016 | Meuninck et al. |
| 9,235,057 B2 | 1/2016 | Robinson et al. |
| 9,237,337 B2 | 1/2016 | Ramsey et al. |
| 9,243,774 B2 | 1/2016 | Kim et al. |
| 9,247,228 B2 | 1/2016 | Malik |
| 9,250,448 B2 | 2/2016 | Robinson |
| 9,261,641 B2 | 2/2016 | Sykora et al. |
| 9,261,694 B2 | 2/2016 | Payne et al. |
| 2003/0067421 A1 | 4/2003 | Sullivan |
| 2003/0197933 A1 | 10/2003 | Sudo et al. |
| 2004/0165264 A1 | 8/2004 | Uehara et al. |
| 2004/0174604 A1 | 9/2004 | Brown |
| 2004/0192430 A1 | 9/2004 | Burak et al. |
| 2005/0059487 A1 | 3/2005 | Wilder et al. |
| 2005/0083400 A1 | 4/2005 | Hirayama et al. |
| 2005/0111100 A1 | 5/2005 | Mather et al. |
| 2005/0190443 A1 | 9/2005 | Nam et al. |
| 2006/0023065 A1 | 2/2006 | Alden |
| 2006/0039181 A1 | 2/2006 | Yang et al. |
| 2006/0044987 A1 | 3/2006 | Anderson et al. |
| 2006/0078180 A1 | 4/2006 | Berretty |
| 2006/0244918 A1 | 11/2006 | Cossairt et al. |
| 2007/0146358 A1 | 6/2007 | Ijzerman |
| 2007/0165305 A1 | 7/2007 | Mehrle |
| 2007/0222954 A1 | 9/2007 | Hattori |
| 2007/0229778 A1 | 10/2007 | Cha et al. |
| 2007/0255139 A1 | 11/2007 | Deschinger et al. |
| 2007/0268590 A1 | 11/2007 | Schwerdtner |
| 2008/0079662 A1 | 4/2008 | Saishu et al. |
| 2008/0094853 A1 | 4/2008 | Kim et al. |
| 2008/0123182 A1 | 5/2008 | Cernasov |
| 2008/0204550 A1 | 8/2008 | De Zwart et al. |
| 2008/0211734 A1 | 9/2008 | Huitema et al. |
| 2008/0225114 A1 | 9/2008 | De Zwart et al. |
| 2008/0247042 A1 | 10/2008 | Scwerdtner |
| 2008/0259233 A1 | 10/2008 | Krijn et al. |
| 2008/0281767 A1 | 11/2008 | Garner |
| 2008/0291267 A1 | 11/2008 | Leveco et al. |
| 2008/0316303 A1 | 12/2008 | Chiu et al. |
| 2008/0316604 A1 | 12/2008 | Redert et al. |
| 2009/0002335 A1 | 1/2009 | Chaudhri |
| 2009/0051759 A1 | 2/2009 | Adkins et al. |
| 2009/0217209 A1 | 8/2009 | Chen et al. |
| 2009/0309887 A1 | 12/2009 | Moller et al. |
| 2009/0309958 A1 | 12/2009 | Hamagishi et al. |
| 2010/0007582 A1 | 1/2010 | Zalewski |
| 2010/0026795 A1 | 2/2010 | Moller et al. |
| 2010/0026797 A1 | 2/2010 | Meuwissen et al. |
| 2010/0033813 A1 | 2/2010 | Rogoff |
| 2010/0080448 A1 * | 4/2010 | Tam ............... H04N 13/0257 382/154 |
| 2010/0097687 A1 | 4/2010 | Lipovetskaya et al. |
| 2010/0110316 A1 | 5/2010 | Huang et al. |
| 2010/0165081 A1 | 7/2010 | Jung et al. |
| 2010/0245548 A1 | 9/2010 | Sasaki et al. |
| 2010/0309290 A1 | 12/2010 | Myers |
| 2011/0000971 A1 | 1/2011 | Onderko |
| 2011/0013258 A1 | 1/2011 | Lee et al. |
| 2011/0032483 A1 | 2/2011 | Hruska et al. |
| 2011/0074773 A1 | 3/2011 | Jung |
| 2011/0085094 A1 | 4/2011 | Kao et al. |
| 2011/0109629 A1 | 5/2011 | Ericson et al. |
| 2011/0149030 A1 | 6/2011 | Kang et al. |
| 2011/0188773 A1 * | 8/2011 | Wei ............... G06K 9/40 382/260 |
| 2011/0210964 A1 | 9/2011 | Chiu et al. |
| 2011/0234605 A1 | 9/2011 | Smith et al. |
| 2011/0246877 A1 | 10/2011 | Kwak et al. |
| 2011/0249026 A1 | 10/2011 | Singh |
| 2011/0254929 A1 | 10/2011 | Yang et al. |
| 2011/0291945 A1 | 12/2011 | Ewing, Jr. et al. |
| 2011/0316679 A1 | 12/2011 | Pihlaja |
| 2012/0013606 A1 | 1/2012 | Tsai et al. |
| 2012/0019883 A1 | 1/2012 | Chae et al. |
| 2012/0026586 A1 | 2/2012 | Chen |
| 2012/0050262 A1 | 3/2012 | Kim et al. |
| 2012/0057006 A1 | 3/2012 | Joseph et al. |
| 2012/0057229 A1 | 3/2012 | Kikuchi et al. |
| 2012/0062549 A1 | 3/2012 | Woo et al. |
| 2012/0069019 A1 | 3/2012 | Richards |
| 2012/0069146 A1 * | 3/2012 | Lee ............... H04N 13/0048 348/43 |
| 2012/0081359 A1 | 4/2012 | Lee et al. |
| 2012/0102436 A1 | 4/2012 | Nurmi |
| 2012/0113018 A1 | 5/2012 | Yan |
| 2012/0120063 A1 | 5/2012 | Ozaki |
| 2012/0154559 A1 | 6/2012 | Voss et al. |
| 2012/0202187 A1 | 8/2012 | Brinkerhoff, III |
| 2012/0206484 A1 | 8/2012 | Hauschild et al. |
| 2012/0223879 A1 | 9/2012 | Winter |
| 2012/0229450 A1 | 9/2012 | Kim et al. |
| 2012/0229718 A1 | 9/2012 | Huang et al. |
| 2012/0249836 A1 * | 10/2012 | Ali ............... G06T 5/003 348/239 |
| 2012/0262398 A1 | 10/2012 | Kim et al. |
| 2012/0274626 A1 * | 11/2012 | Hsieh ............... H04N 13/0011 345/419 |
| 2012/0274634 A1 | 11/2012 | Yamada et al. |
| 2012/0281906 A1 * | 11/2012 | Appia ............... H04N 13/026 382/154 |
| 2013/0027390 A1 | 1/2013 | Kim et al. |
| 2013/0038611 A1 | 2/2013 | Noritake et al. |
| 2013/0202221 A1 * | 8/2013 | Tsai ............... H04N 13/0007 382/296 |
| 2014/0035902 A1 | 2/2014 | An et al. |

(56) References Cited

U.S. PATENT DOCUMENTS

| | | |
|---|---|---|
| 2014/0036173 A1 | 2/2014 | Chang |
| 2014/0132726 A1 | 5/2014 | Jung |
| 2014/0192172 A1 | 7/2014 | Kang et al. |
| 2014/0355302 A1 | 12/2014 | Wilcox et al. |
| 2015/0070481 A1 | 3/2015 | S. et al. |
| 2015/0185957 A1 | 7/2015 | Weng et al. |
| 2015/0226972 A1 | 8/2015 | Wang |
| 2015/0260999 A1 | 9/2015 | Wang et al. |
| 2015/0341616 A1 | 11/2015 | Siegel et al. |

* cited by examiner

METHOD AND APPARATUS FOR CONVERTING 2D-IMAGES AND VIDEOS TO 3D FOR CONSUMER, COMMERCIAL AND PROFESSIONAL APPLICATIONS

CROSS-REFERENCE TO RELATED APPLICATIONS

This application claims benefit of U.S. provisional patent application Ser. No 61/897,106, filed Oct. 29, 2013, which is herein incorporated by reference.

FIELD OF THE INVENTION

Embodiments here relate generally to the field of 2D to 3D video and image conversion performed either in real time or offline, with application in consumer image/video editing software, consumer 3D display devices such as TVs, game consoles, mobile devices etc., consumer satellite and cable boxes, electronic billboards and displays for commercial advertisement, and post-production professional video editing software or solution for converting existing 2D movies and videos to 3D. More particularly, embodiments relate to a method and apparatus for extracting depth information automatically and/or semi-automatically from various visual cues in a monocular image and using the said depth information to render the image in 3D for different 3D display technologies and formats.

BACKGROUND

The rising sale of 3D-enabled TVs and personal devices in the consumer segment, releasing of new and old movies in 3D and increasing use of large screen electronic billboards which can display attention grabbing 3D-images for advertising or informational purposes, has increased the need for creating 3D-content. The ability to convert existing 2D content to 3D content automatically or with limited manual intervention can result in large cost and time saving and will grow the 3D-content creation market even further.

Traditionally, converting 2D videos to 3D for professional application consists of very labor intensive process of rotoscoping where objects in each frame are manually and painstakingly traced by the artist and depth information for each object is painted by hand. This traditional 2D to 3D conversion suffers from disadvantages. Depending on the complexity of the scene in each frame, it may take several hours to several days to generate a depth map of a single frame. A 2-hour movie at 24 frames per second may contain up to one hundred thousand unique frames and this manual depth map creation can cost upwards of $200 per frame. Consequently, this method is very expensive and slow.

On the low end of the 2D to 3D conversion, consumer 3D-TV sets have built in hardware that can automatically convert 2D video or image into 3D in real time. However, the 3D quality is extremely poor with hardly any depth effect in the converted 3D-image. Such fully automated method is obviously not acceptable by professional movie post-production houses.

There have been numerous research publications on methods of automatically generating depth map from a monoocular 2D-image for the purpose of converting the 2D-image to 3D-image. The methods range from very simplistic heuristics to very complicated and compute intensive image analysis. Simple heuristics may be suitable for real time conversion application but provides poor 3D quality. On the other hand, complex mathematical analysis may provide good 3D-image quality but may not be suitable for real time application and hardware implementation.

A solution to this quality versus difficulty dilemma is to start with an automated default lower quality 3D-image and provide ability to add additional manual editing capabilities to enhance the 3D image quality.

DETAILED DESCRIPTION

Figure 1:
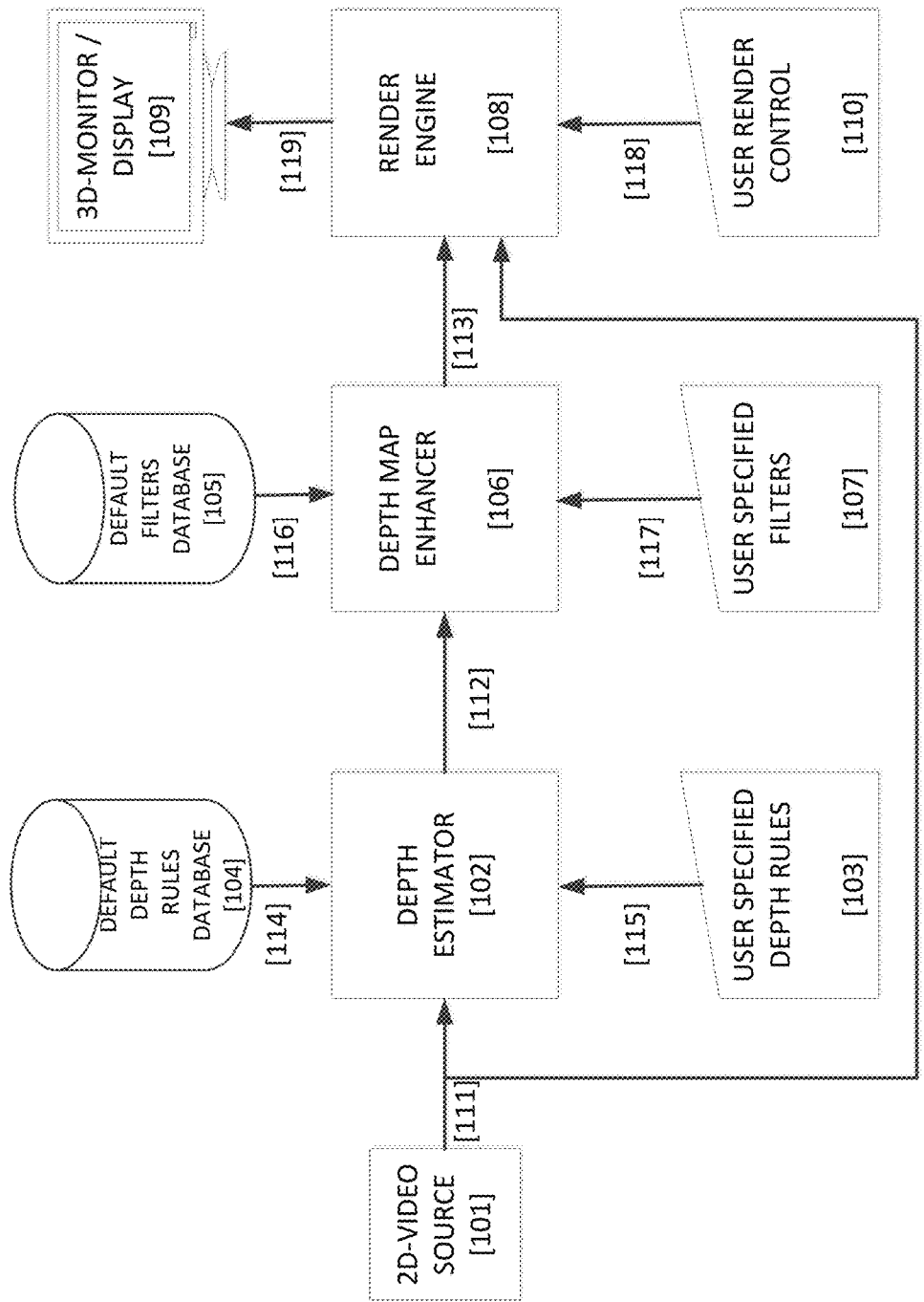
FIG. 1 shows an exemplary block diagram of the system, according to one embodiment of the invention

Embodiments of the present invention relate to a method, apparatus, system, and computer program for generating automatically using set of pre-defined heuristic rules to generate a depth map from mono-ocular (2D) image source. Optionally, in a semi-manual mode, user can augment or replace pre-defined heuristic rules with user defined rules to generate superior quality depth map. The said depth map in conjunction with the original 2D image source can be used to generate 3D image in any format desired. The embodiments of the invention can take advantage of the computing power of general purpose CPU, GPU or dedicated FPGA or ASIC chip to process sequence of images from video frames of a streaming 2D-video to generate 3D video frames. Depending on the available processing capabilities of the processing unit and complexity and size of pre-defined rules, the conversion of 2D video frames to 3D can be done in real time in automatic mode.

In one embodiment, the 2D to 3D conversion algorithm is implemented as a software application running on a computing device, such as a personal computer, tablet computer or smart-phone. A user receives a streaming 2D-video from the Internet or from a file stored on a local storage device and uses the application to automatically convert the 2D video to 3D and display it on the attached 3D display in real time. In one embodiment, the converted 3D-video can be stored back on the local or network storage device. In one embodiment, the user can modify or augment the pre-defined heuristic rules for depth map estimation and depth map filters to produce user-desired quality and format of 3D-image. In one embodiment, the user can save the custom heuristic rules for each 2D-image or a sequence of 2D-images in a control file using some pre-defined syntax such as XML and can play the said control file together with the 2D-image or 2D-image sequence to reproduce the 3D-image or image sequences or the depth map for the image or image sequences.

In one embodiment, the 2D to 3D conversion process is implemented as a software application running on a computing device such as a personal computer, tablet computer or smart-phone. A user loads a video from a file stored on a local or network attached storage device and uses the application to automatically or in an interactive mode convert the 2D video to 3D and store it back offline on the local or network attached disk. In one embodiment, the user can adjust or augment the pre-defined heuristic rules for depth map estimation and depth map filters to produce user-desired quality and format of 3D-image. In one embodiment the user can adjust existing rules and add new rules through graphical user interface (GUI) of the application. In one embodiment, the user modified or added rules can be stored in a control file using some pre-defined syntax such as XML and can be read in by the 2D to 3D conversion application and applied in the conversion.

In one embodiment, the 2D to 3D conversion algorithm is implemented in dedicated hardware such as an FPGA (field programmable gate array) or custom ASIC (application specific integrated circuit) chip. In one embodiment, the entire 2D to 3D video conversion system is implemented as a stand-alone converter box. In one embodiment, the entire 2D to 3D video conversion system is implemented a circuit board or a daughter card. In one embodiment, a stand-alone implantation of the conversion system can be attached to the output of a streaming video receiver, broadcast TV receiver, satellite-TV receiver or cable-TV receiver and the output of standalone converter box can be connected to 3D-displays.

In one embodiment, the 2D to 3D conversion algorithm is implemented as a software application utilizing on the graphics processing unit (GPU) of a computing device such as a personal computer, tablet computer or smart-phone to enhance performance.

FIG. 1 shows an exemplary block diagram of the 2D to 3D conversion process, according to one embodiment of the invention. In one embodiment, the process comprises of receiving single or a sequence of image frames. Each pixel of the image frame, singularly or as a group, is analyzed. Based upon either default depth rules or user specified depth rules, the process assigns a depth value to the pixels. In one embodiment, the depth value of the entire frame is stored as grey scale depth map image. In one embodiment, the raw depth map image is further processed and filtered according to default rules and/or user defined rules. In one embodiment, the processed depth map image is applied to the original 2D-image to calculate pixel displacements in by the render engine. Default and or user adjustments are applied to fine tune the 3D-rendering of the original 2D-image for the 3D-display device.

Referring back to FIG. 1, in one embodiment the system comprises a 2D-video source 101 that can stream video either from local or remote source. The depth estimator 102 estimates the depth of each pixel in the image frame using default set of rules stored in a rules database 104. An example of a default rule will be "if the position of the pixel is in upper third of the image frame and the color is within certain range of blue, and the intensity is greater than 60% then assign depth for this pixel the value for sky." In one embodiment, the user can input additional rules interactively at 103 or through a file as illustrated by 104. In one embodiment, output raw depth map 112 from 104 can be further refined, filtered and processed by depth enhancer 106 using default rule sets from 105 or user defined rule sets from 107. In one embodiment, the output refined depth map 113 from 106 is used with the original 2D-image 111 by the render engine 108 to produce a 3D-image 119. The rendering may be controlled by the user at 110.

Figure 2:
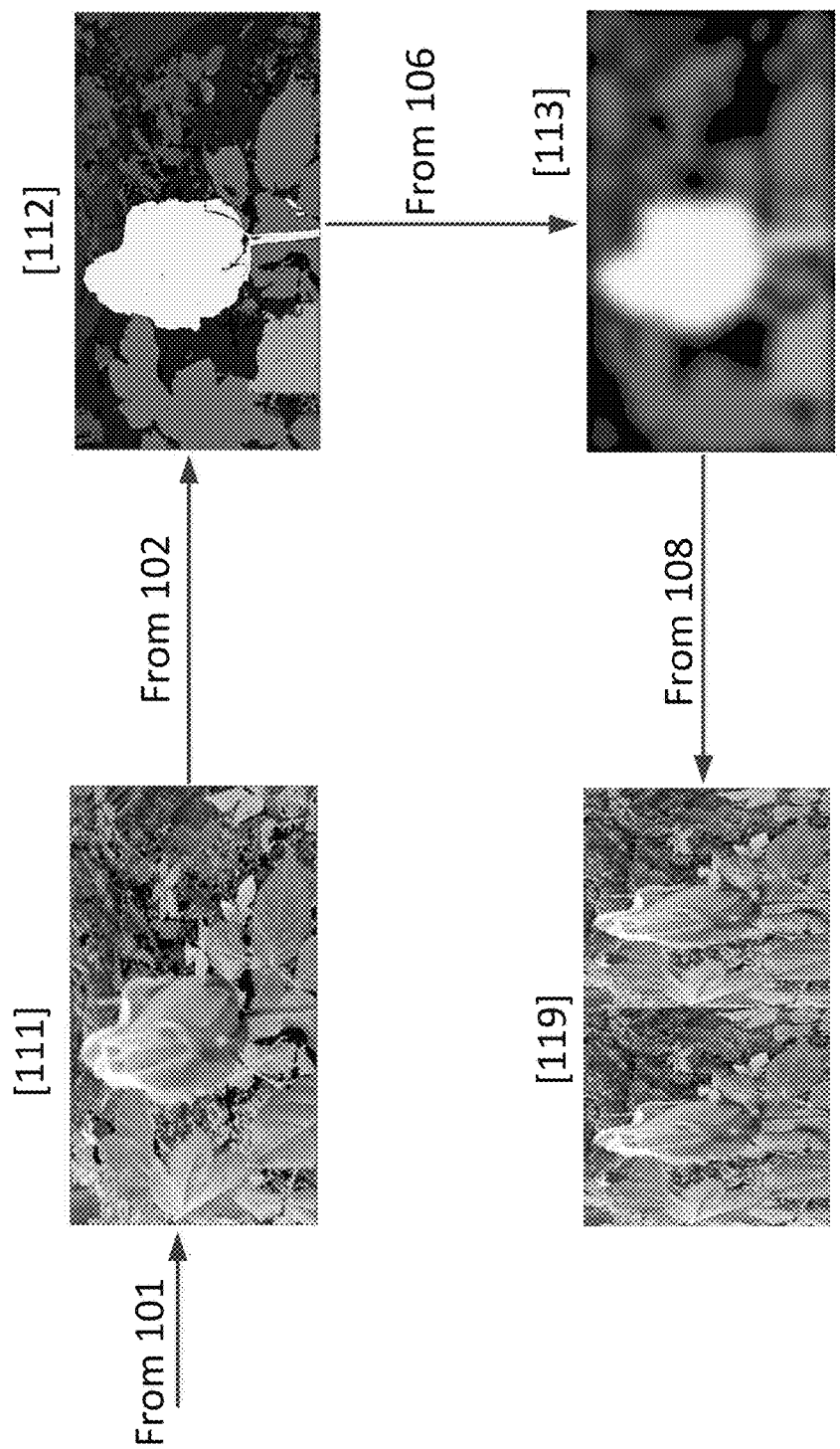
FIG. 2 shows an exemplary transformation of an image frame as it is processed in the system pipeline.

FIG. 2 illustrates one embodiment of the images 111, 112, 113 and 119 as they go through transformation from one processing block to the next. The original image 111 comes from the 2D video source 101. The image 112 results from the depth estimator 102. The depth map enhancer 106 produces the image 113. The process then renders the image 119 on the display 109.

Figure 3:
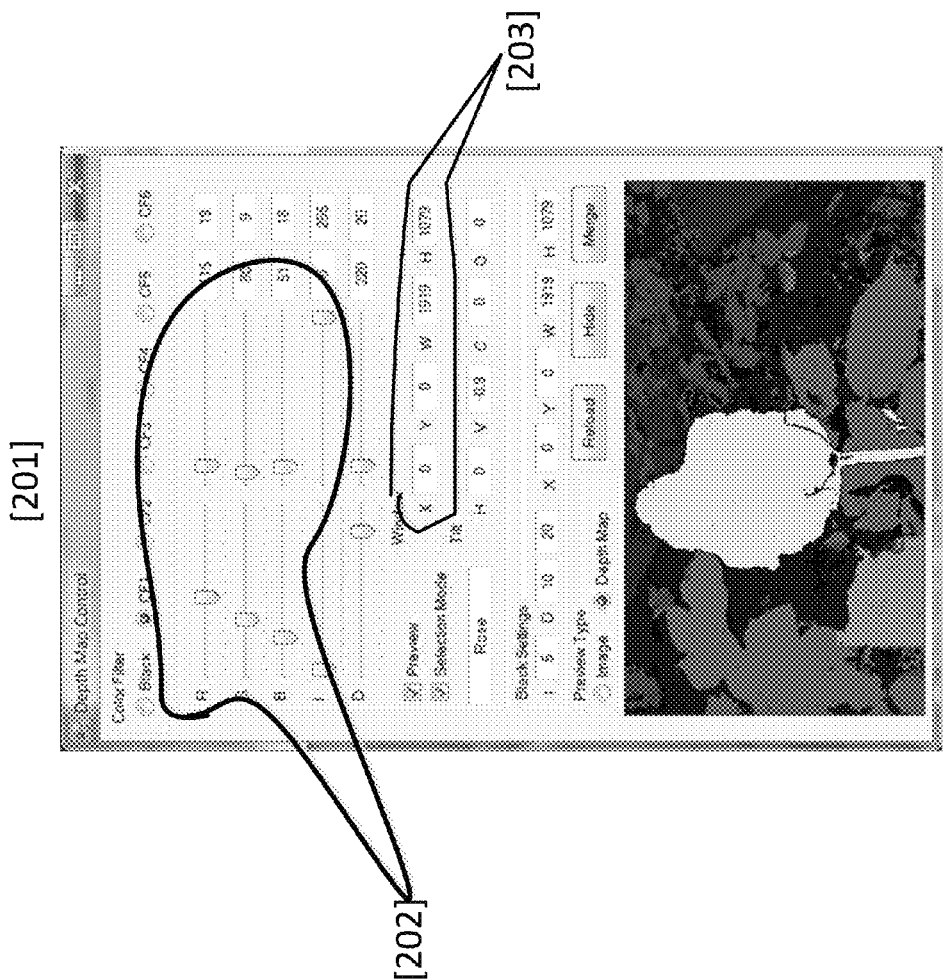
FIG. 3 and FIG. 4 illustrate two exemplary graphical user interfaces (GUI) for user to add or modify rules for depth map estimation, according to one software embodiment of the invention.

FIG. 3 illustrates one embodiment of graphical user interface (GUI) 201 to enable the user to enter depth rules consisting of color, intensity and location of the pixel within the image frame. Block 202 illustrates one embodiment of specifying pixel color range as RGB values with offsets and intensity value. Block 203 illustrates one embodiment of bounding box region for the rule to apply. 201 also illustrates an embodiment of a preview window showing the result of applying the rules on depth map.

Figure 4:
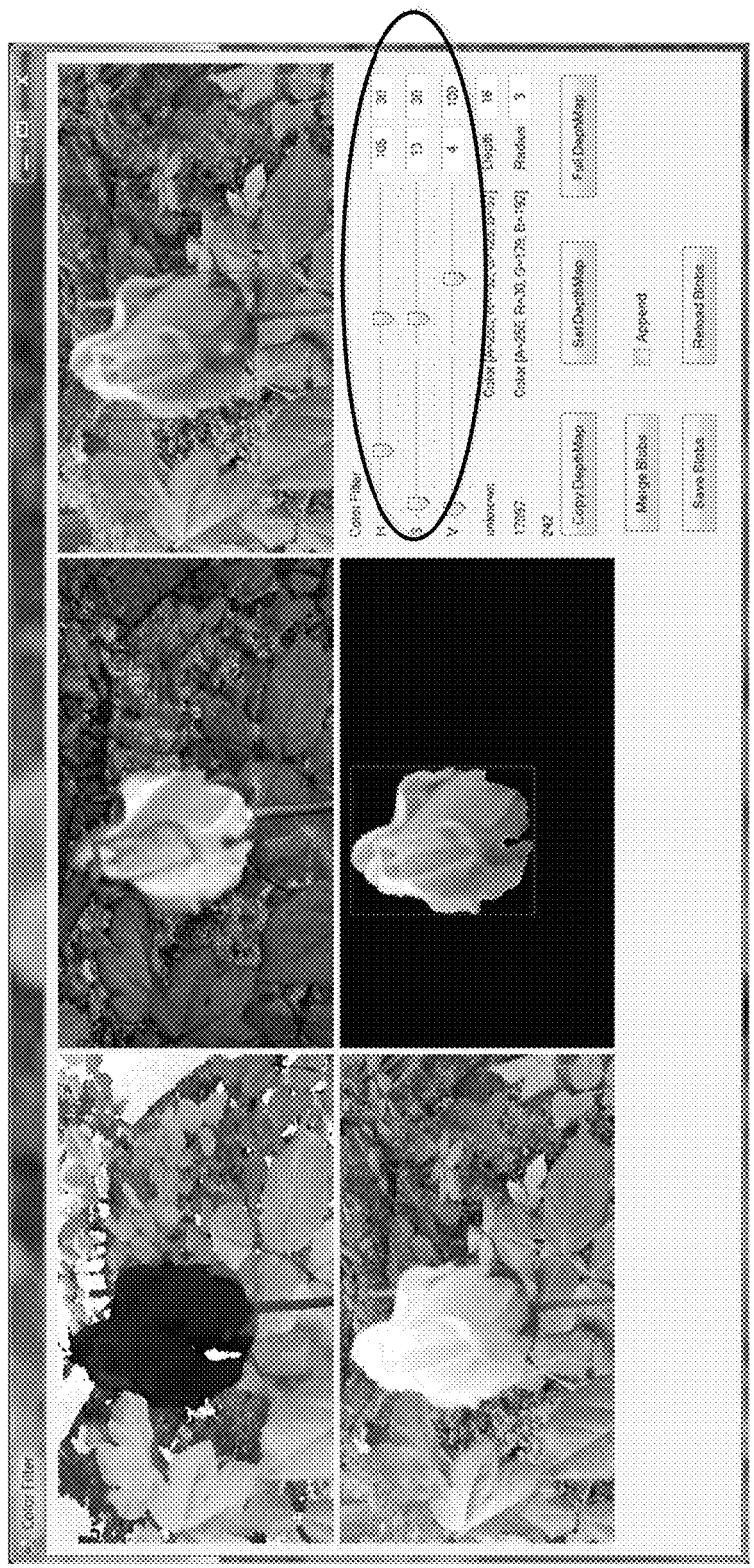

FIG. 4 illustrates one embodiment of graphical user interface (GUI) 204 to enable the user to enter depth rules consisting of hue, saturation and intensity of the pixel within the image frame. The user makes these inputs through a series of sliders, or other user interface devices in 205.

Figure 5:
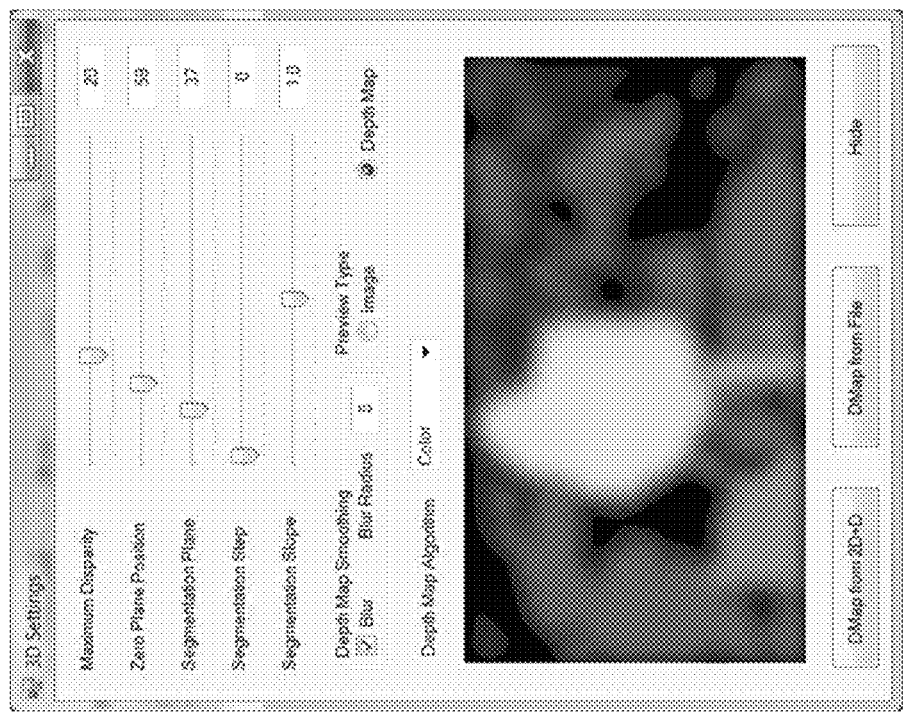
FIG. 5 illustrates a graphical user interface (GUI) for user to control depth map filters, according to one embodiment of the invention.

FIG. 5 illustrates one embodiment of graphical user interface (GUI) 206 to enable the user to enter depth map filtering and processing. The GUI 206 also illustrates an embodiment of a preview window showing the result of applying the rules on depth map.

Figure 6:
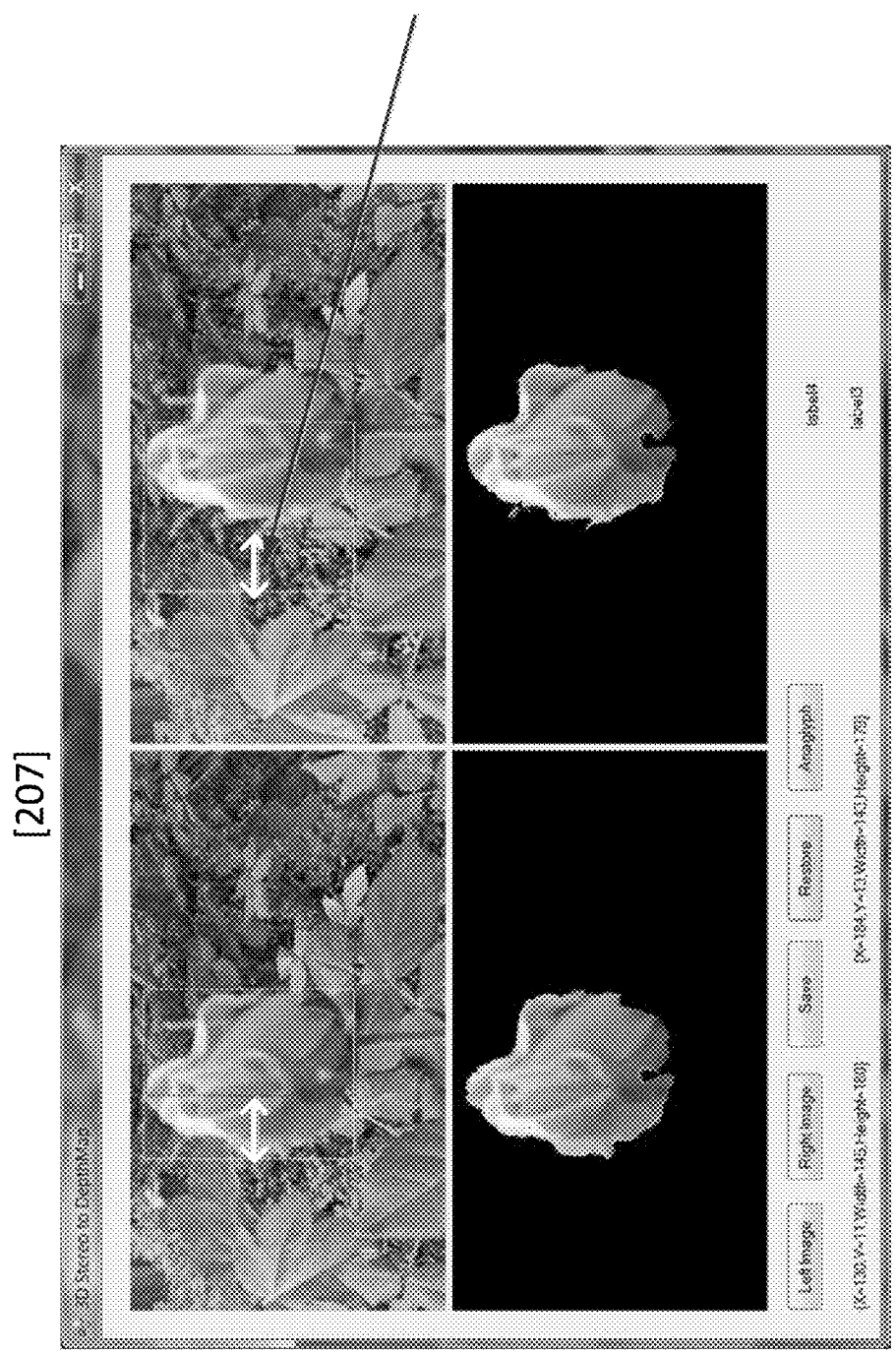
FIG. 6 illustrates an exemplary method for generating depth map from the left and right eye views of a stero-3D image by finding disparity between left and right views for each object, according to one embodiment of the invention.

FIG. 6 illustrates one embodiment of graphical user interface (GUI) 207 to enable the user to identify and associate similar objects in the left and right eye views manually using mouse selection operation. The user input region 208 also illustrates an embodiment showing the disparity between the same object in left and right eye views and the process uses this disparity to calculate depth value for pixels within the object.

Figure 7:
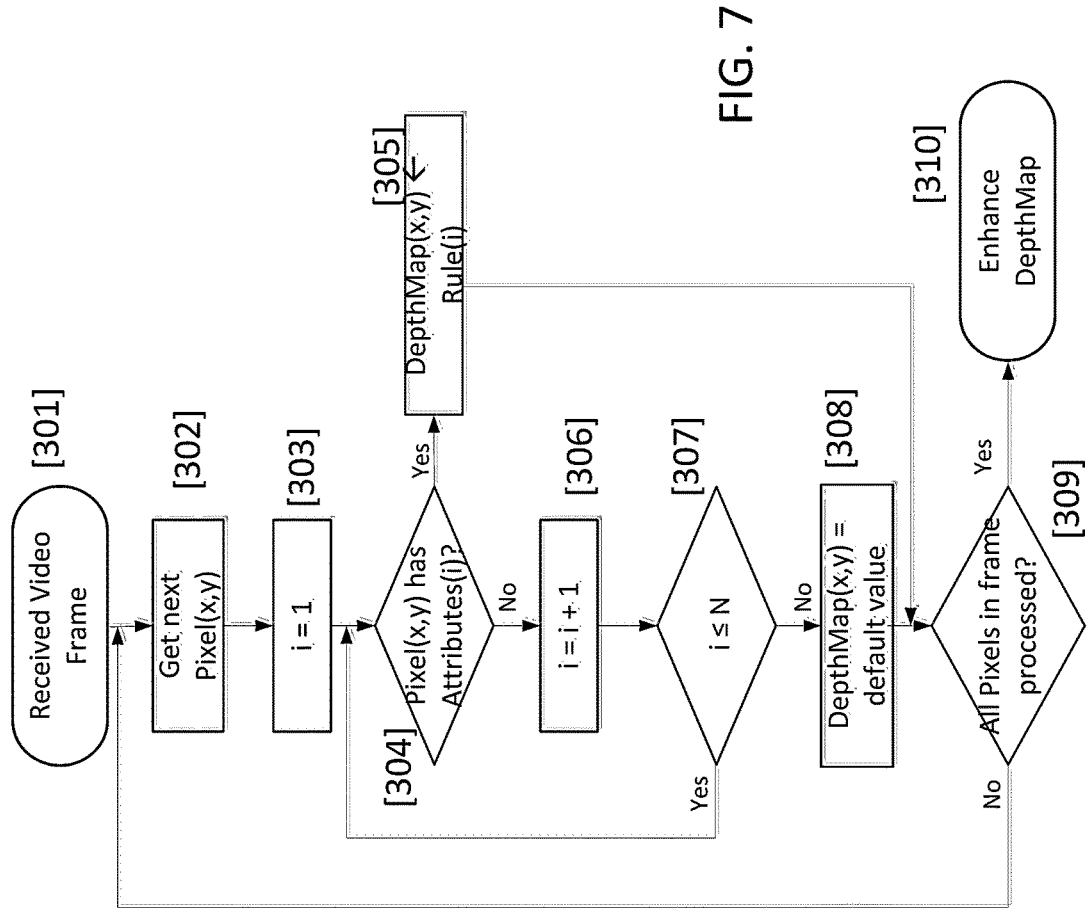
FIG. 7 illustrates a flow chart for computing depth map from a 2D image source, according to one embodiment of the invention.

FIG. 7 shows a flowchart of one embodiment of a method to calculate the depth of each pixel with in the image frame. The process starts with the received 2D video frame at 301. At 302 the process takes a pixel from the image, initialized a counter i and compares the pixel attributes against some or all the depth map rules in 304. If the rule specified attributes are found in the pixel, the pixel depth is calculated using the matching rule, as shown in block 305. If no rule matches pixel, the counter is incremented, checked to ensure it is less than a threshold count N, and a default depth value is assigned as shown in 308. This process continues until all of the pixels in the frame are processed at 309, producing the enhanced depth map at 310.

Figure 8:
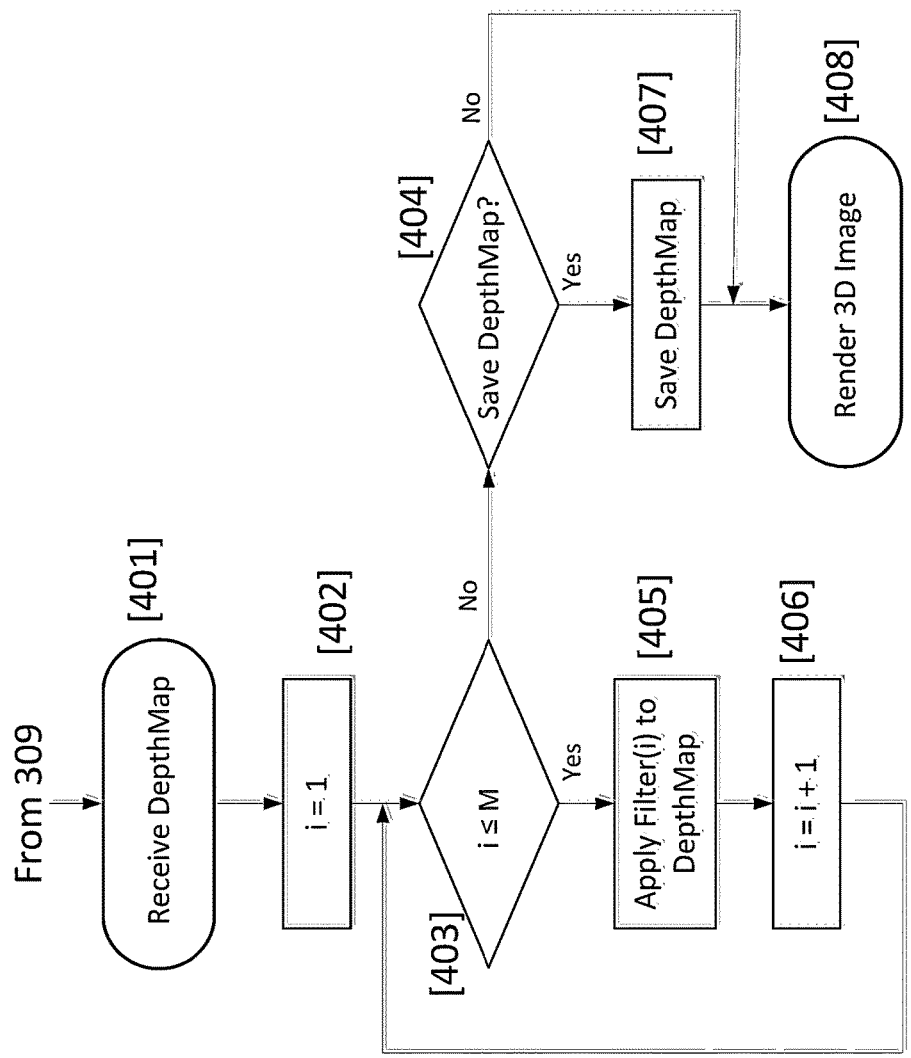
FIG. 8 illustrates a flow chart for additional processing and filtering depth map to enhance and/or exaggerate 3D-effects, according to one embodiment of the invention.

FIG. 8 shows a flow chart of one embodiment of a method to enhance a depth map image. Various default and or user specified filter operations can be applied to post process the raw depth map generated. The depth map is received, such as from 309 in the previous process, although the depth map may be produced by other means. Again, a counter is initialized at 402. If the counter is below a previously decided count at 403, the process moves to applying the filter for that iteration to the depth map at 405. The counter is then incremented at 406 and the process returns to 403. If the counter reaches its final count at 403, he generated depth map can be optionally saved as a grey-scale image, as shown in block 407. The 3D image is then rendered at 408.

Figure 9:
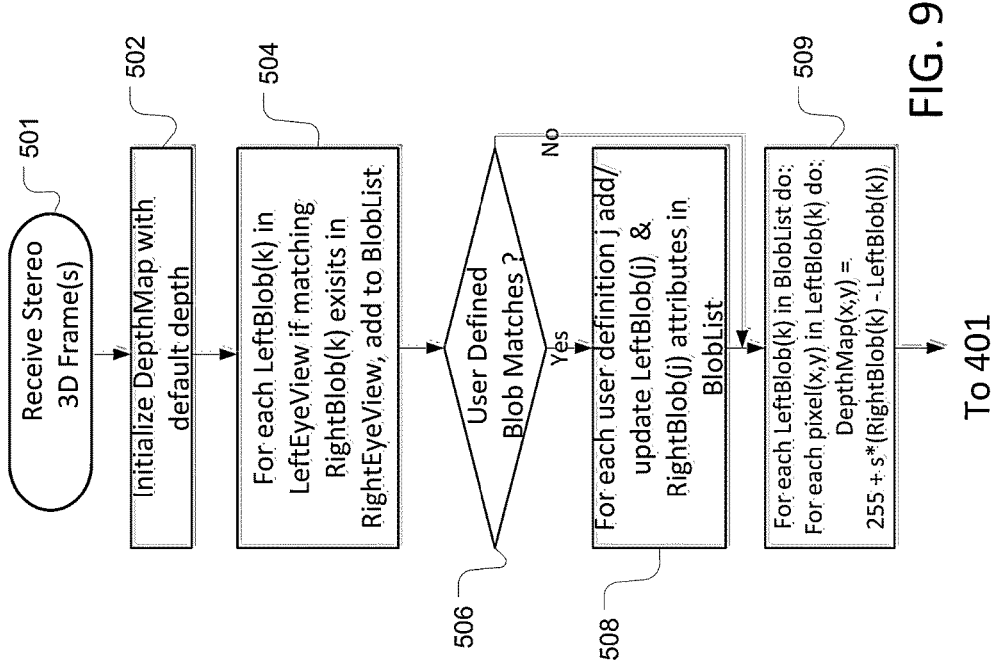
FIG. 9 illustrates a flow chart for computing depth map from a 3D-stero image source which contains a left eye view and a right eye view of the scene, according to one embodiment of the invention.

FIG. 9 illustrates one embodiment of a block diagram for estimating a depth map from a stereo 3D-image, which may result from a process other than that discussed with regard to FIG. 3. The stereo 3D image consists of a left eye view and a right eye view of the scene and is received at 501. Initially, the depth may is assumed to have some default depth at 502. Similar objects, referred to here as 'blobs' from the left and right eye views are identified either automatically using some attributes such as color, intensity, size and location or manually by user defined instructions. These blobs are added to the blob list. The user defined blob matches if they exist at 506, result in an update to the blob list at 508. The process then generates a depth map value for that pixel at 509, which eventually results in the entire depth map used at 401 in FIG. 8. The disparity between and left and right eye view for the same object is a direct measure of the depth of the object, and this disparity data is used to estimate the depth of each pixel with in the object.

Figure 10:
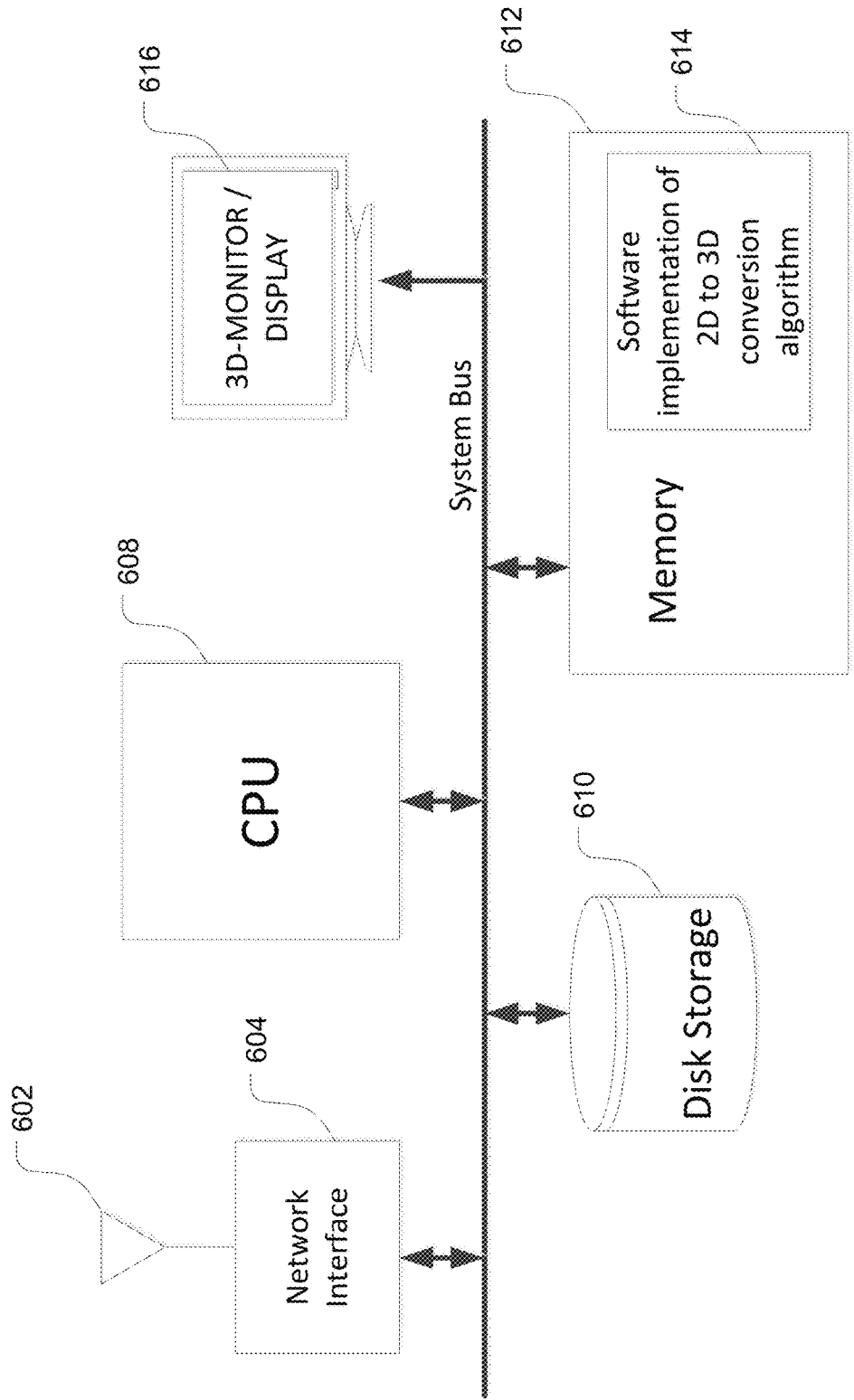
FIG. 10 illustrates a system diagram, according to one embodiment of the invention.

FIG. 10 illustrates a system diagram, according to one embodiment of the invention. The instructions such as 614 for the method flow charts described above are stored on a memory 612 as machine-readable instructions that when executed cause a processor such as 608 in a specific system to execute the instructions. In one embodiment, the system is a mobile device. In another embodiment, the system is the stand alone computer. In another embodiment the system is an embedded processor in a larger system. Elements of embodiments are provided as a machine-readable storage medium for storing the computer-executable instructions. The machine-readable storage medium may include, but is not limited to, flash memory, optical disks, CD-ROMs, DVD ROMs, RAMs, EPROMs, EEPROMs, magnetic or optical cards, or other type of machine-readable storage media suitable for storing electronic or computer-executable instructions including disk storage 610. For example, embodiments of the invention may be downloaded as a computer program which may be transferred from a remote computer to a requesting computer by way of data signals via a communication link 602 coupled to a network interface 604 for the requesting computer. The processor 608 executes the instructions to render the 3D image on the display 616.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description.

What is claimed is:

1. A method for converting 2D images and videos to 3D comprising:

(a) applying a set of pre-defined heuristic rules to assign a depth value for a set of pixels of a two-dimensional (2D) image source based on pixel attributes to generate an initial default depth map where said initial default depth map is generated based upon;
  (i) selecting a first one of said pixels of said two-dimensional (2D) image and setting a counter;
  (ii) comparing said first one of said pixels of said two-dimensional (2D) image against said set of pre-defined heuristic rules based upon said pixel attributes;
  (iii) if said comparing said first one of said pixels based upon said pixel attributes is found in said first one of said pixels then said depth value for said first pixel is assigned;
  (iv) if said comparing said first one of said pixels based upon said pixel attributes is not found in said first one of said pixels then incrementing said counter;
  (v) if said counter is less than a threshold then selecting another pixel of said pixels of said two-dimensional (2D) image;
  (vi) if said counter is greater than a threshold then assigning a default said depth value for said first one of said pixels;
  (vii) repeating said selecting, said comparing of steps (i) through (vi) for said set of said pixels of said two-dimensional (2D) image;
  (viii) wherein said set of pre-defined heuristic rules include (a) a first rule based upon color of said pixels of said two-dimensional (2D) image, (b) a second rule based upon at individual intensity of individual said pixels of said two-dimensional (2D) image in a manner independently of said individual intensity of other said pixels of said two-dimensional (2D) image, (c) a third rule based upon a location of said pixels of said two-dimensional (2D) image where different locations of said pixels within said two-dimensional (2D) image have different heuristic rules based upon their respective locations, (d) and a rectangular bounding box of said pixels of said two-dimensional (2D) image;
(b) refining the pre-defined heuristic rules to produce customized heuristic rules;
(c) applying the customized heuristic rules to the initial default depth map to produce a refined depth map; and
(d) rendering a three-dimensional (3D) image in a pre-defined format using the refined depth map.

2. The method of claim 1, wherein the pixel attributes comprise at least one of position, color, intensity, and adjacent pixel attributes.

3. The method of claim 1, wherein refining the pre-defined heuristic rules comprises receiving a set of user defined rules to one of augment or replace the pre-defined heuristic rules.

4. The method of claim 1, wherein refining the initial depth map comprises manual selection of regions in the original 2D image based on at least one of pixel position, color, intensity, initial depth value range, assigning depth values for pixels in the regions, and modifying depth values for pixels in the regions.

5. The method of claim 1, further comprising scanning a stereo, three dimensional image having two views for same objects within the two views and calculating depth value based on horizontal displacements between the same objects in the two views.

6. The method of claim 1, wherein refining the initial depth map comprises performing image processing and filtering.

7. The method of claim 1, further comprising saving the refined depth map as a grey scale image.

8. The method of claim 7, wherein rendering the 3D image comprises using the grey scale image.

9. The method of claim 1, further comprising saving the customized heuristics as a control file.

10. The method of claim 9, wherein rendering the 3D image comprises using the control file to render the image.

11. The method of claim 1, wherein the method comprises instructions stored in a memory to be executed by a processor.

12. The method of claim 1, wherein the method is executed by a dedicated hardware component comprising one of an FPGA, an ASIC chip, and a dedicated functional unit within a processor.

13. The method of claim 1, wherein the method is executed by a stand alone converter box.

14. The method of claim 1, wherein the method is performed by a component of computing device comprises one of a circuit board, a daughter card, and a plug-in card.

15. The method of claim 1, wherein receiving the 2D image comprises receiving a 2D image from one of an output of a streaming video receiver, a broadcast TV receiver, satellite-TV receiver and a cable-TV.

16. The method of claim 1, wherein rendering the 3D image comprises rendering the 3D image as one of a stereo 3D image, an auto-stereo 3D image and an anaglyph.

* * * * *

UNITED STATES PATENT AND TRADEMARK OFFICE
CERTIFICATE OF CORRECTION

PATENT NO. : 9,967,546 B2
APPLICATION NO. : 14/522211
DATED : May 8, 2018
INVENTOR(S) : Javed Sabir Barkatullah It is certified that error appears in the above-identified patent and that said Letters Patent is hereby corrected as shown below:

In the Specification

Column 4, Line 67: Delete "he" and replace with --the--.

Signed and Sealed this
Nineteenth Day of November, 2019

Andrei Iancu
*Director of the United States Patent and Trademark Office*